(12) United States Patent
Lavelle et al.

(10) Patent No.: US 9,429,135 B2
(45) Date of Patent: Aug. 30, 2016

(54) WAVE ENERGY CONVERSION DEVICE

(75) Inventors: Eugene Lavelle, Kinvara (IE); Thomas Lyne, Killarney (IE); Joseph Murtagh, Celbridge (IE)

(73) Assignee: Sea Power Limited, Galway (IE)

( * ) Notice: Subject to any disclaimer, the term of this patent is extended or adjusted under 35 U.S.C. 154(b) by 143 days.

(21) Appl. No.: 13/699,790

(22) PCT Filed: May 26, 2011

(86) PCT No.: PCT/EP2011/058700
§ 371 (c)(1),
(2), (4) Date: Dec. 4, 2012

(87) PCT Pub. No.: WO2011/147949
PCT Pub. Date: Dec. 1, 2011

(65) Prior Publication Data
US 2013/0067903 A1    Mar. 21, 2013

(30) Foreign Application Priority Data

May 26, 2010 (IE) .................................. S2010/0344

(51) Int. Cl.
*F03B 13/20* (2006.01)
(52) U.S. Cl.
CPC .............. *F03B 13/20* (2013.01); *F05B 2240/95* (2013.01); *F05B 2250/313* (2013.01); *Y02E 10/38* (2013.01)
(58) Field of Classification Search
CPC ........... F03B 13/20; F03B 13/12; F04B 17/00
USPC ............... 60/500, 502, 503, 504, 506; 290/53
See application file for complete search history.

(56) References Cited

U.S. PATENT DOCUMENTS

| | | | |
|---|---|---|---|
| 3,931,740 A * | 1/1976 | Carter | G01N 1/10 210/242.3 |
| 4,023,515 A | 5/1977 | Tharaldson | |
| 4,210,821 A * | 7/1980 | Cockerell | F03B 13/20 290/53 |
| 4,781,023 A * | 11/1988 | Gordon | F03B 13/20 290/42 |
| 4,931,662 A | 6/1990 | Burton | |
| 5,244,359 A | 9/1993 | Slonim | |
| 5,507,943 A | 4/1996 | Labrador | |
| 6,003,458 A * | 12/1999 | Valliere | B63B 1/14 114/61.15 |
| 6,140,712 A | 10/2000 | Fredriksson | |

(Continued)

FOREIGN PATENT DOCUMENTS

| | | |
|---|---|---|
| CA | 2513155 | 1/2007 |
| CA | 2652273 | 6/2008 |

(Continued)

OTHER PUBLICATIONS

Random Seas and Design of Maritime Structures by Y.Goda.*

*Primary Examiner* — Thomas Denion
*Assistant Examiner* — Shafiq Mian
(74) *Attorney, Agent, or Firm* — Sutherland Asbill & Brennan LLP

(57) ABSTRACT

A wave energy conversion device including a first pontoon configured to respond to an incident wave by operating in at least a first mode of motion and a second pontoon movably attached to the first pontoon by attachment means and configured to respond to an incident wave by operating in at least one mode of motion different from the first mode of motion. The relative motion of the first pontoon to the second pontoon in response to an incident wave is converted into a desired form of energy.

20 Claims, 11 Drawing Sheets

(56) References Cited

U.S. PATENT DOCUMENTS

| | | | |
|---|---|---|---|
| 6,476,511 B1* | 11/2002 | Yemm | F03B 13/20 290/42 |
| 2006/0216116 A1* | 9/2006 | Baker | F41H 11/05 405/63 |
| 2007/0200353 A1* | 8/2007 | Ottersen | F03B 13/20 290/53 |
| 2007/0253841 A1 | 11/2007 | Burns et al. | |
| 2008/0019847 A1 | 1/2008 | Burns et al. | |
| 2008/0098883 A1 | 5/2008 | Burns | |
| 2009/0084296 A1* | 4/2009 | McCormick | F03B 13/20 114/26 |
| 2009/0107328 A1 | 4/2009 | Burns et al. | |
| 2010/0038913 A1* | 2/2010 | Svelund | F03B 13/1815 290/53 |
| 2011/0121572 A1* | 5/2011 | Levchets | F03B 13/20 290/53 |
| 2011/0169265 A1* | 7/2011 | Chen | F03B 7/00 290/53 |
| 2012/0001431 A1* | 1/2012 | Smith | F03B 13/1815 290/53 |

FOREIGN PATENT DOCUMENTS

| | | |
|---|---|---|
| DE | 10130748 | 1/2003 |
| DK | 98693 | 3/1995 |
| EP | 0365325 | 4/1990 |
| EP | 1036273 | 9/2000 |
| ES | 2162604 | 12/2001 |
| GB | 566691 | 1/1945 |
| GB | 1524147 | 9/1978 |
| GB | 2453670 | 4/2009 |
| GB | 2472469 | 2/2011 |
| JP | 57081168 | 5/1982 |
| JP | 59206680 | 11/1984 |
| WO | 99/28622 A1 | 6/1999 |
| WO | 00/17519 A1 | 3/2000 |
| WO | 02/36891 A1 | 5/2002 |
| WO | 03033824 | 4/2003 |
| WO | 2004033899 | 4/2004 |
| WO | 2008/135046 A2 | 11/2008 |

* cited by examiner

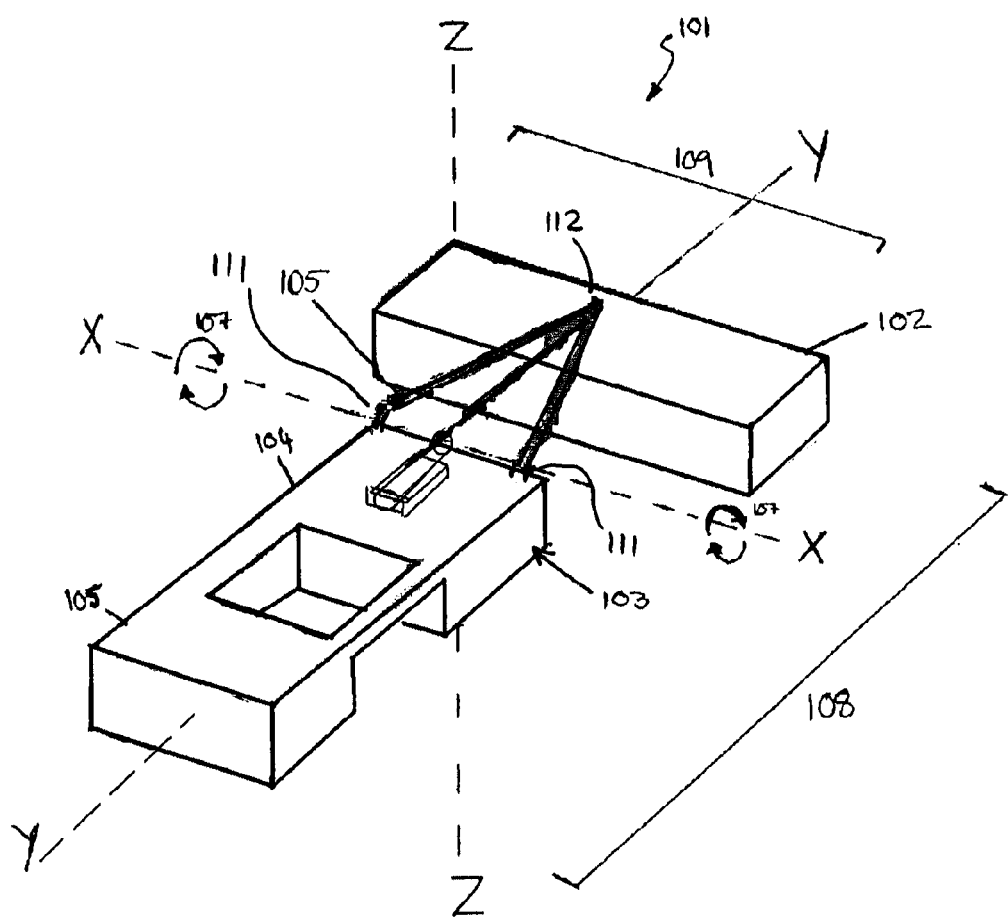

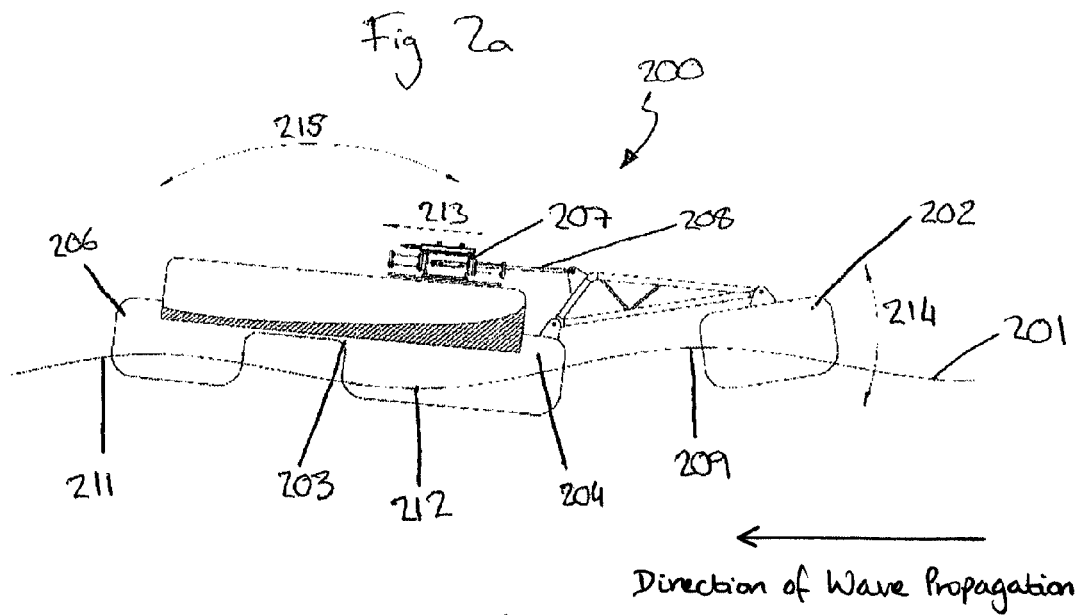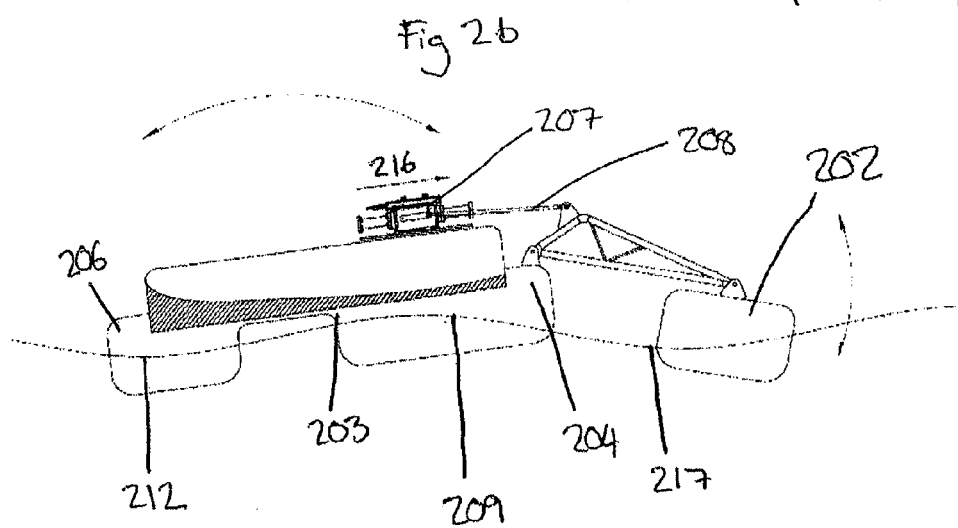

Direction of Wave Propagation

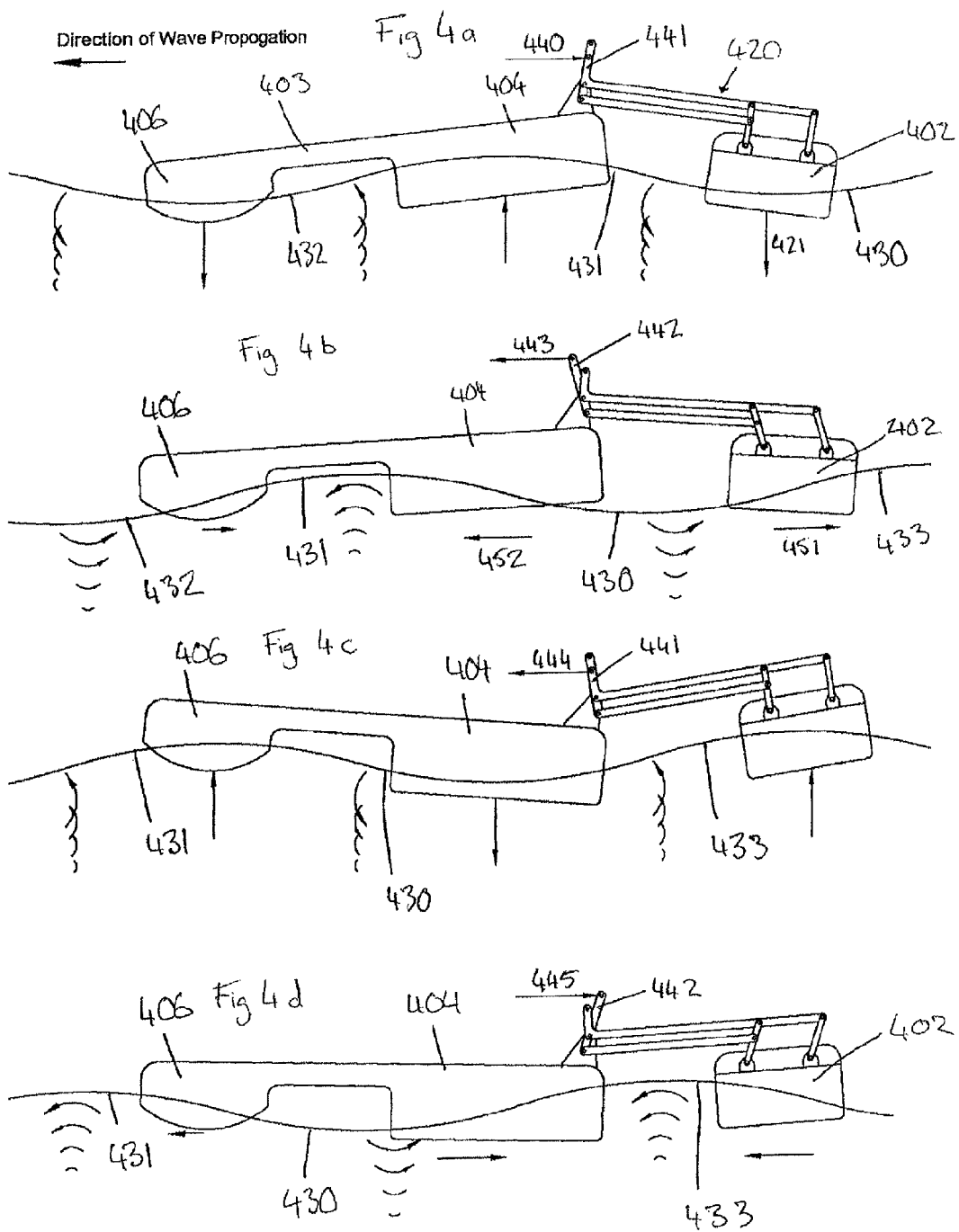

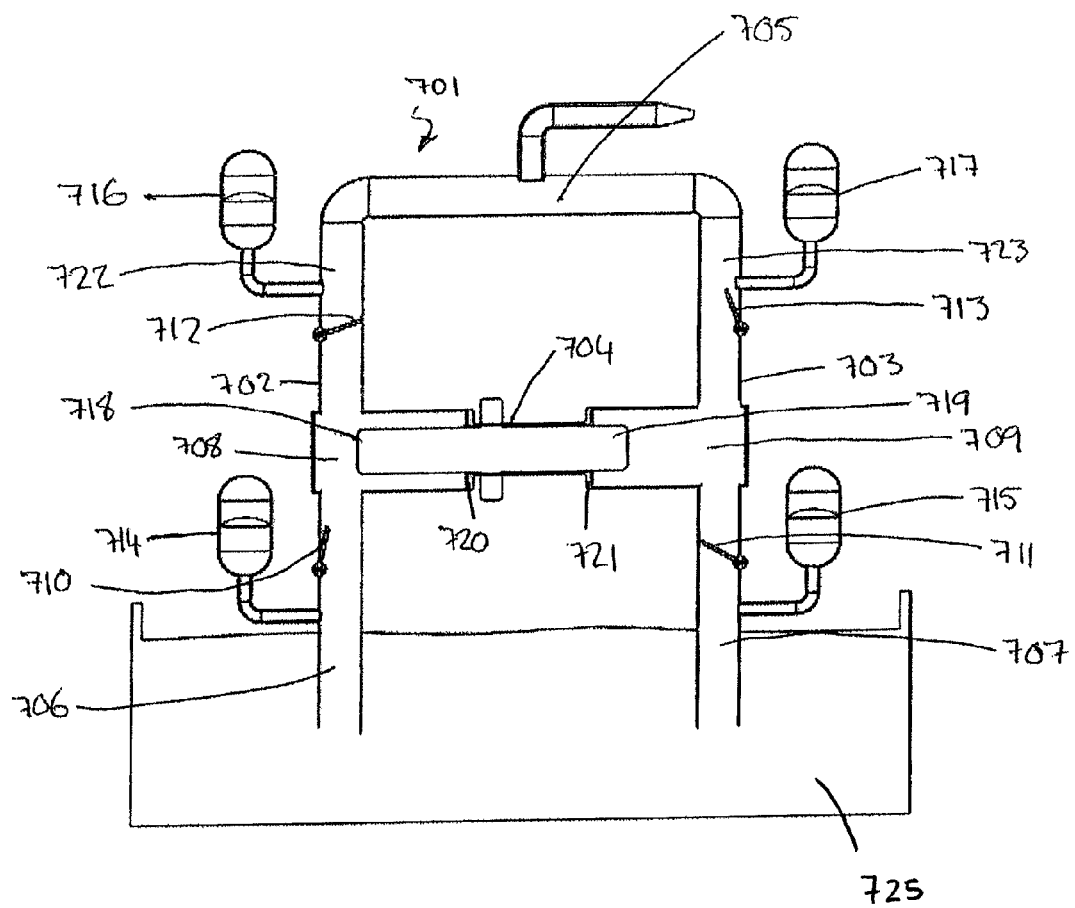

WAVE ENERGY CONVERSION DEVICE

TECHNICAL FIELD

The present invention relates to the field of wave energy conversion and also to the fields of associated technologies such as power take off systems and fluid hydraulics.

BACKGROUND OF THE INVENTION

Much effort is presently being made to develop efficient and robust means of extracting energy from renewable resources. Harnessing wave energy—in particular—presents a number of design challenges with respect to both the efficiency and robustness of systems fit for such a purpose.

Many wave energy converters (WECs) rely on a movable body, such as a pontoon, moving in one mode, such as heaving motion. In such wave energy converters, the movable body is connected to a second reference body, such as a second, larger pontoon, or some form of fixed position structure, and the movement of the moveable body relative to the reference body is harnessed and converted into energy. However, it is proven that such designs are not capable of capturing more than 50% of the wave energy. There is therefore a need to provide a wave energy converter that is capable of extracting energy from waves more efficiently.

One proposal for extracting energy from ocean waves is a wave-powered prime mover comprising a pair of pontoons connected to a central inertial barge, for example as seen in WO 99/28622. The pontoons are arranged symmetrically with respect to the tethered barge and are pivotally movable by waves relative to the barge. The pitching of the pontoons operates hydraulic pumps connected between each pontoon and the barge to convert the pitching motion into water pressure energy. Another proposal for a wave energy plant comprising two pontoons is based on the principle of Cockerell's raft and is described in WO 2008/135046. Two interhinged pontoons are connected by a hydraulic power take-off system. The pontoons heave up and down as waves pass and this causes them to pivot about the centre of the device, causing movement of the hydraulic actuator. Yet another proposal for a wave power apparatus is described in WO 00/17519 and known as a Pelamis machine. This device comprises an articulated chain-like structure made up of cylindrical members that can undergo relative rotational movement. While some of these and other proposals have been commercialised, all such WEC devices rely on a single mode of motion to convert energy from the waves and therefore suffer from the inefficiencies outlined above.

Many WEC systems deploy oil-hydraulic cylinders as the actuators in the energy extraction system. However, it will be appreciated that there are significant environmental risks associated with using oil hydraulics, particularly at sea, where inevitable leaks cause problems. Other WEC systems propose electrical linear generators, but at this time, these are at a very early stage of development. Some WEC systems overcome these identified drawbacks by implementing hydraulic actuators that utilise seawater as the energy transfer medium. However, seawater has significant potential to degrade and break down materials exposed to it (through both mechanical and chemical action), and so seawater hydraulic systems need to be able to withstand such forces.

Most water pumps on the market today are of open impeller, centrifugal design. This is a low cost solution to general purpose pumping. These pumps, however, have very low efficiency (approx 40%) and more importantly, cannot deliver high pressure heads unless multiple pumps are configured in series. The complexity of such arrangements make them clearly unattractive for implementation in a wave energy converter. High pressure pumps, such as those used in the desalination industry (Reverse Osmosis plants) are of multiple stage design and generally use positive displacement pistons and cylinders as opposed to open impellers. However, these pumps cannot handle raw seawater, as this would lead to rapid wear and component failure, and are therefore limited in their utility.

U.S. Pat. No. 6,140,712 describes a double-acting hose pump used in the context of a wave energy converter. The pump consists of a pair of hose pumps connected to a common outlet pipe. A disadvantage with such a pump is that the pressure that the flexible hoses can withstand will limit the pressure generated. In an environment where a high pressure output is desirable (such as in the context of a wave energy converter), this would be a serious limitation.

Another pump is described in UK Patent No. GB 2453670. The described pump is a double-acting pump used in the context of a wave energy converter. The pump consists of a double-acting, reciprocating piston designed to pump seawater via a pair of suction legs, each comprising a chamber, an inlet valve and an outlet valve, through to a common outlet pipe. However, while on the upstroke of the piston the body of fluid passing through one suction leg is accelerated, the return stroke sees the fluid body on this side of the pump lose acceleration, only to be accelerated again on the next upstroke. This occurs in the same manner at the other suction leg and the return strokes of the piston. It will be appreciated that expending energy re-accelerating the fluid body at the start of each second stroke results in energy loss and a significant deterioration in pumping performance. Furthermore, it should be noted that the volumes of the two chambers may not be equal, because the piston shaft passes through one chamber but not the other. This may be disadvantageous if continual flow and pressure is desired. Furthermore, the piston/dual chamber arrangement comprises a single integrated unit that would be difficult to repair, because the surface cooperating with the plunger seal is situated on the inside of the chamber. Furthermore, leakage in the piston seal would affect the fluid being pumped out of both chambers. As mentioned above, piston based pumps are of little utility for pumping seawater, because the piston needs high pressure, high velocity, high wear resistance piston seals or rings, and there is nothing on the market yet to achieve this economically.

It would be desirable to provide a wave energy conversion device and related systems that address all the issues cited above, and overcome the limitations of existing solutions.

SUMMARY OF THE INVENTION

In a first aspect of the invention, there is disclosed a wave energy conversion device for use in a body of water comprising:

a first pontoon configured to respond to an incident wave by operating in at least a first mode of motion;

a second pontoon movably attached to the first pontoon by attachment means and configured to respond to an incident wave by operating in at least one mode of motion different from the first mode of motion;

wherein the relative motion of the first pontoon to the second pontoon in response to an incident wave is converted into a desired form of energy.

It will be understood that according to the invention there is provided a pair of pontoons in which one pontoon operates in a first mode motion while the other pontoon operates in a second, different, mode of motion. The term "mode of motion" refers to a distinct motion having its own characteristic frequency and energy. In the context of a wave energy conversion device, typical modes of motion include heaving (vertical motion perpendicular to the direction of travel of a wave, i.e. up and down between wave troughs and crests), surging (horizontal motion along the direction of travel of a wave), and pitching (rotational motion at an angle $0°<0<\pm 90°$ relative to the direction of travel of a wave i.e. twisting about an axis aligned with the wave crests as waves pass). Such modes of motion are independent of one another and can each contribute to the overall motion of a floating body, depending on its freedom to move in response to the waves. It is an advantageous feature of the invention that the relative motion of two pontoons moving in two different modes of motion is converted into energy. Thus, for example, one pontoon may be configured to respond to waves with (at least) a heaving motion while the other pontoon may be configured to respond to waves with (at least) a pitching motion and the relative motion between these two different modes is used for energy conversion. Consequently the resultant power curve for the device will contain contributions from at least two different modes of motion and the energy conversion efficiency is improved as compared to a device that only converts energy from a single mode of motion.

According to a preferred set of embodiments, the first pontoon and the second pontoon respond to the same incident wave. This may be achieved by selecting the overall length of the device, the spacing of the pontoons and/or the dimensions of the pontoons relative to the prevailing wavelength at a given site, for example as is described in more detail below.

According to a preferred set of embodiments, the mode of motion of the first pontoon is one or more of a heaving motion and a surging motion.

According to a preferred set of embodiments, the mode of motion of the second pontoon is one or more of a pitching motion, a surging motion, and/or a heaving motion.

In one preferred set of embodiments, the first pontoon comprises an elongate body, and the second pontoon is attached to the first pontoon adjacent to or at the midpoint of the elongate axis of the first pontoon, wherein the device is orientated when in use such that the elongate axis of the first pontoon is parallel to the wave crests of incident waves. In other words, the elongate axis of the first pontoon is aligned perpendicular to the direction of travel of the waves.

This ensures the first pontoon is capable of responding effectively to incident waves. In particular, as the first pontoon comprises an elongate body aligned along the wave crests, it preferably does not experience any substantial pitching motion in the direction of travel of the waves. Instead, the first pontoon predominantly moves in a heaving mode of motion as the wave crests pass by. A surge motion may also be experienced. The elongate body preferably comprises a dimension along its elongate axis that is much greater than a dimension perpendicular to its elongate axis which is aligned with the direction of travel of the waves.

In a modification of the set of embodiments set out directly above, the dimension of the first pontoon along its elongate axis is determined by the prevailing wave crest length of the body of water where the device is to be located.

This maximises the effectiveness of the response of the first pontoon to incident waves. In particular, when the pontoon is dimensioned to match the wave crest length then it will not pitch in a direction perpendicular the direction of travel of the waves. Instead the entire length of the pontoon is moved up and down with the waves in a heaving motion so as to maximise the energy available from this mode of motion.

In one preferred set of embodiments, the second pontoon has a surface area greater than the surface area of the first pontoon, and the dimension of the second pontoon along its axis which is located transverse to the elongate axis of the first pontoon is greater than the dimension of the first pontoon in the direction transverse to its elongate axis. The second pontoon preferably comprises an elongate body with the device orientated when in use such that the elongate axis of the second pontoon is transverse to the wave crests of incident waves, in other words, aligned with the direction of travel of the waves. As a result of the different orientation of the second pontoon to the waves as compared to the first pontoon, the second pontoon is optimally positioned to capture a different mode of motion to the first pontoon. For example, while the first pontoon is heaving in response to incident waves the second pontoon may be pitching along the direction of travel of the waves. Either or both of the first and/or second pontoon may also move in a surging mode of motion.

Constraining the dimensions of the pontoons helps to minimize the reactance component (imaginary part) of the impedance, and to maximize the resistance component (real part) of the impedance, of the device when in use. This is advantageous because it is the resistance component from which the wave energy can be extracted. Thus the relative dimensions and/or orientation of the first and second pontoons can be selected or designed, e.g. based on empirical testing, to achieve a resonant or near resonant response to oncoming waves.

It will be appreciated that the device may be orientated such that oncoming waves are first incident on either the first pontoon or the second pontoon. The orientation of the device with respect to the wave direction may depend on how well the motion of the second pontoon is tuned to the waves in terms of whether its natural resonant period matches the incident wave frequency. This will depend on the pontoon's mass to buoyancy (stiffness) ratio. If the second pontoon is not optimally tuned then it contributes to the power absorption by virtue of its inertia rather than by virtue of its excitation. In this case the second pontoon behaves better as an inertial body and works better when it is positioned aft of the first pontoon relative to the direction of oncoming waves. However it has been found that in at least one set of embodiments it is preferable for the device to be orientated when in use such that, relative to the direction of oncoming waves, the second pontoon is forward and the first pontoon is aft. In this case the second pontoon may be tuned such that its mode of motion is in phase with the oncoming waves and has a frequency matching that of the waves so as to achieve a resonant excitation from the oncoming waves. In such embodiments the second pontoon can be optimally positioned to make a large power contribution from its resonant mode of motion.

In a modification of the embodiments of the invention set out directly above, the dimension of the device which is transverse to the axis of the wave crests of the body of water where the device is to be located is between 0.5 and 1 times the prevailing wavelength of the body of water where the device is to be located.

In another modification of the embodiments of the invention set out directly above, the dimension of the device which is transverse to the axis of the wave crests of the body of water where the device is to be located is between 0.6 and 1.1 times the prevailing wavelength of the body of water where the device is to be located. In other words, the dimension of the device which is aligned with the direction of travel of the waves is preferably between 0.6 and 1.1 times the prevailing wavelength at the site of the device.

This allows the reactance of the device when in use to be minimized even more effectively. As is mentioned above, empirical test results may be used to select the dimension of the device as a function of wavelength that will optimise the resistance component of the mechanical impedance and hence the available power.

The first and second pontoons may comprise floating bodies having any appropriate shape. The relative shape and dimensions of the pontoons as a function of their surface area in the x-y plane is described above. Looking at the pontoons in cross-section in the z-plane, perpendicular to the water surface, they may have a shape that is generally square, rectangular or oblong. However it is preferable, at least in some embodiments, for the first and/or second pontoon to have a circular cross-section. This is found to minimise the drag losses of the pontoon(s) while in motion. As described above, in at least some embodiments the first pontoon may be an elongate body and thus it can be preferred for the first pontoon to be substantially cylindrical. Furthermore, by adjusting the diameter, mass, ballast and freeboard of each pontoon, it can be possible to match the frequency response of the device such that it oscillates in a resonant mode, which is critical for efficient energy capture. Unlike as for rectangular sections, cylindrical sections permit optimum ratios of body mass and buoyancy stiffness for the pontoon(s).

In one preferred set of embodiments, the device further comprises a tank for holding fluid, which is adapted to adjust the motion characteristics of the one or more modes of motion in which the pontoons are configured to operate.

This also helps to reduce the reactance of the device when in use. In particular, the motion of the fluid in the tank can be tuned to optimise the mode(s) of motion of the pontoon(s) and thus to achieve a resonant state.

In a modification of the set of embodiments set out directly above, the tank comprises a fluid-tight cavity integrated into the second pontoon.

In one set of embodiments the attachment means preferably comprises a drive arm configured to have a single degree of freedom of movement. The attachment means may comprise a drive linkage arranged to allow relative pivotal movement between the first and second pontoons, for example a drive arm may be pivotally connected to the second pontoon and fixedly connected to the first pontoon. Thus it will be understood that the attachment means may be configured such that, as the first pontoon moves in one mode of motion (e.g. heaving up and down), the drive linkage can apply a turning moment to the second pontoon that is preferably in phase with its different mode of motion (e.g. pitching) so as to increase the energy extracted from this mode of motion. The movement of the first pontoon can act to lock the second pontoon in its different mode of motion, thereby increasing the power achieved from the two different modes of motion.

In another set of embodiments the first pontoon is preferably configured to operate in a third mode of motion different from its first mode of motion and the second pontoon is preferably configured to operate in the same third mode of motion in addition to its second mode of motion. For example, both the first and second pontoons may undergo an additional surging motion. In order to be able to extract power from the additional third mode of motion, the attachment means is preferably configured to have two different degrees of freedom of movement, as opposed to a single degree of freedom as outlined above. The attachment means may comprise a drive linkage arranged to allow relative pivotal and horizontal movements between the first and second pontoons. For example, the drive linkage may comprise a pair of parallel drive arms pivotally connected to one another and to the first and/or second pontoons. A drive linkage with two degrees of freedom is able to convert the relative motion of the pontoons into an additional source of energy, for example by picking up energy from a surging mode of motion as well.

In one preferred set of embodiments, the device further comprises an energy output mechanism for converting the relative motion of the first pontoon to the second pontoon into the desired form of energy, wherein the energy output mechanism is linked to the attachment means. The energy output mechanism is preferably arranged to capture energy from the relative motion between the at least two different modes of motion, thereby extracting power from multiple modes as compared to conventional wave energy converters. The energy output mechanism can be in the form of any suitable power take-off device, such as a hydraulic actuator, an electrical linear generator, or a fluid pump.

In a modification of the set of embodiments set out directly above, the device further comprises:

a sensor configured to detect the extent of motion, velocity and/or acceleration of the first pontoon; and an actuator configured to adjust the line of action between the energy output mechanism and the attachment means in response to a signal generated by the sensor as a result of the detection, such that the line of action delivers a constant, uniform force to the energy output mechanism.

This ensures that the device maintains an optimum resistance when in use, and also ensures a constant, uniform force or pressure input to the energy output mechanism. Such a system can provide for dynamic adjustment of the mechanical resistance so that, while varying amounts of energy are extracted from the waves at different points in time, there is a uniform force or pressure input to the energy output mechanism. This can be particularly beneficial if the energy output mechanism comprises a fluid pump, as will be described in further detail below.

In a modification of the set of embodiments set out directly above, in one exemplary system, the sensor comprises a shaft movably attached to the first pontoon such that when the device is located in a body of water, the elongate axis of the shaft is substantially perpendicular to the surface of the water, and the sensor is free to move along its elongate axis relative to the first pontoon; wherein a first end of the shaft is submerged and a second end of the shaft is located above the surface of the water, the first end being attached to a plate, the plate being configured to experience drag forces in the water such that movement of the first pontoon does not translate into commensurate movement of the sensor, thereby causing movement of the sensor relative to the first pontoon, and the second end being associated with a controller, the controller being configured to generate the signal for the actuator when the sensor moves relative to the first pontoon.

In an alternative modification, the sensor is configured to detect the extent of motion, velocity and/or acceleration of the first pontoon relative to the second pontoon, and comprises a rotary encoder located at the point of attachment between the attachment means and the second pontoon, or a linear transducer located on or adjacent the energy output mechanism.

In one set of embodiments, the actuator comprises a solenoid operated proportional valve.

While the energy output mechanism can be in the form of a hydraulic actuator or an electrical linear generator, as is mentioned above, such devices may not be ideally suited to the marine environment and hence it can be preferred for the energy output mechanism to comprise a fluid pump, preferably a seawater pump.

In one preferred set of embodiments, the energy output mechanism comprises a pump, said pump comprising:

a first and a second fluid inlet for interacting with the body of water;

a pair of suction check valves, each suction check valve situated within one of the fluid inlets respectively, for permitting unidirectional fluid flow through each of said fluid inlets;

a first and a second fluid outlet in fluid communication with a single common fluid outlet manifold;

a pair of pump chambers of equal volume situated adjacent to one another, each chamber in fluid communication with one of the fluid inlets and one of the fluid outlets, and each chamber further having an aperture arranged such that the two apertures are aligned;

a plunger block partially located in both pump chambers such that it protrudes through both apertures sufficiently to form a watertight seal with the apertures and which is moveable between both pump chambers;

wherein movement in a direction which increases the portion of the plunger block located in one pump chamber causes a commensurate decrease in the portion of the plunger block located in the other pump chamber;

and adapted such that, when in use, the pump delivers a single unidirectional fluid output flow at the fluid outlet manifold.

It will be understood that in such embodiments a double-acting plunger block is used to pump fluid through both the first and second fluid inlets, and the first and second fluid outlets, during respective forward and reverse strokes so that the power take-off is maximised while providing a single unidirectional output flow. The uniform output flow can be used to power various subsequent systems, some examples of which are outlined below.

In one set of embodiments, the pump further comprises a pair of delivery check valves, each situated within one of the fluid outlets respectively, for permitting unidirectional fluid flow out of each of the pump chambers and through each of the fluid outlets into the fluid outlet manifold. This can ensure that there is no back flow in the system.

In a further set of embodiments, the pump further comprises a pair of vacuum chambers for containing a partial vacuum, each vacuum chamber in fluid communication with one of the fluid inlets respectively, such that when in use, movement of the plunger block in a first direction draws a first inlet column of fluid along the first fluid inlet, and a subsequent return movement of the plunger block in the opposite direction draws a second inlet column of fluid along the second fluid inlet, and wherein the vacuum chamber in fluid communication with the first fluid inlet prevents the first inlet column of fluid from returning back in the opposite direction along the first fluid inlet when it is not being drawn along by the plunger block and wherein the vacuum chamber in fluid communication with the second fluid inlet prevents the second inlet column of fluid from returning back in the opposite direction along the second fluid inlet when it is not being drawn along by the plunger block. Advantageously, the pair of vacuum chambers can be tuned so that the columns of fluid in the first and second fluid inlets oscillate in time with the strokes of the plunger block, thereby increasing the pump efficiency.

In an additional set of embodiments, the pump further comprises a pair of pressurised accumulator chambers, each accumulator chamber in fluid communication with one of the fluid outlets respectively, such that when in use, movement of the plunger block in a first direction urges a first outlet column of fluid along the first fluid outlet, and a subsequent return movement of the plunger block in the opposite direction urges a second outlet column of fluid along the second fluid outlet, and wherein the accumulator chamber in fluid communication with the first fluid outlet prevents the first outlet column of fluid from returning back in the opposite direction along the first fluid outlet when it is not being urged along by the plunger block and wherein the accumulator chamber in fluid communication with the second fluid outlet prevents the second outlet column of fluid from returning back in the opposite direction along the second fluid outlet when it is not being urged along by the plunger block.

In an alternative set of embodiments, the pump further comprises a pressurised accumulator chamber in fluid communication with both the first and second fluid outlets, such that when in use, movement of the plunger block in a first direction urges a first outlet column of fluid along the first fluid outlet, and a subsequent return movement of the plunger block in the opposite direction urges a second outlet column of fluid along the second fluid outlet, and wherein the accumulator chamber in fluid communication with the first and second fluid outlets prevents the first outlet column of fluid from returning back in the opposite direction along the first fluid outlet when it is not being urged along by the plunger block and prevents the second outlet column of fluid from returning back in the opposite direction along the second fluid outlet when it is not being urged along by the plunger block.

According to either of the sets of embodiments set out directly above, there is provided a smooth flow output as a result of the pressurised accumulator chamber(s). The or each pressure accumulator may be a gas to water accumulator, but is not confined to such a design.

In one set of embodiments, the plunger block is coated in a plasma coating. Such a coating is advantageous because it can result in very low frictional losses due to movement of the plunger block, as well as providing corrosion and erosion resistance to the effects of seawater as the pump fluid. The efficiency and durability of the pump as a power take-off system is thereby improved.

Some possible uses for the fluid output flow from the pump will now be described by way of exemplary embodiments. However, it will be appreciated that the pump can provide a power take-off system suitable for use with many different Wave Energy Converters.

In one set of embodiments, when the device is in use, the single unidirectional fluid output flow at the fluid outlet manifold is used to drive a Pelton wheel to generate electricity. By directly powering a Pelton wheel with the fluid output flow there can be achieved a high efficiency for conversion into electrical energy.

In another set of embodiments, when the device is in use, the single unidirectional fluid output flow at the fluid outlet manifold is used to deliver fluid into a reservoir for subsequent use in hydroelectric electricity generation.

In one set of embodiments, when the device is in use, the single unidirectional fluid output flow at the fluid outlet manifold is used in a Reverse Osmosis system for desalination of water.

A seawater pump as described directly above may provide several advantages over a hydraulic power take-off system, for instance, because it can be more robust and better designed for a marine environment. By using seawater as the pump fluid, the environmental risks associated with the leakage of hydraulic fluid can be removed.

Such a pump may be considered novel and inventive in its own right, and thus when viewed from another aspect the invention comprises a pump suitable for pumping raw seawater, comprising:

a first and a second fluid inlet for interacting with the body of fluid;

a pair of suction check valves, each suction check valve situated within one of the fluid inlets respectively, for permitting unidirectional fluid flow through each of said fluid inlets;

a first and a second fluid outlet in fluid communication with a single common fluid outlet manifold;

a pair of pump chambers of equal volume situated adjacent to one another, each chamber in fluid communication with one of the fluid inlets and one of the fluid outlets, and each chamber further having an aperture arranged such that the two apertures are aligned;

a plunger block partially located in both pump chambers such that it protrudes through both apertures sufficiently to form a watertight seal with the apertures and which is moveable between both pump chambers;

wherein movement in a direction which increases the portion of the plunger block located in one pump chamber causes a commensurate decrease in the portion of the plunger block located in the other pump chamber;

and adapted such that, when in use, the pump delivers a single unidirectional fluid output flow at the fluid outlet manifold.

The advantages of a such a pump have already been discussed hereinabove.

In a set of embodiments it is preferred that, wherein when the pump is in use, the single unidirectional fluid output flow at the fluid outlet manifold is used is used in deep well injection drilling.

These and other features of the present application and the resultant patent will become apparent to one of ordinary skill in the art upon review of the following detailed description when taken in conjunction with the several drawings and appended claims.

BRIEF DESCRIPTION OF THE DRAWINGS

Some embodiments of the invention will now be described, by way of example only, and with reference to the accompanying drawings, in which:

FIG. 1 is a perspective view of a Wave Energy Converter according to a first embodiment of the present invention;

FIG. 2a-b are cross-sectional side views of the Wave Energy Converter of FIG. 1, showing the antagonistic motions of the heaving forward pontoon and the pitching rear pontoon as the device encounters wave peaks and troughs;

FIGS. 4a-d are cross-sectional side views of a second embodiment of a Wave Energy Converter, showing the forward and rear pontoons configured to respond to surging forces as well as pitch and heave;

FIG. 9 is a cross sectional side view of a pump according to an embodiment of the present invention;

DETAILED DESCRIPTION

Figure 3:
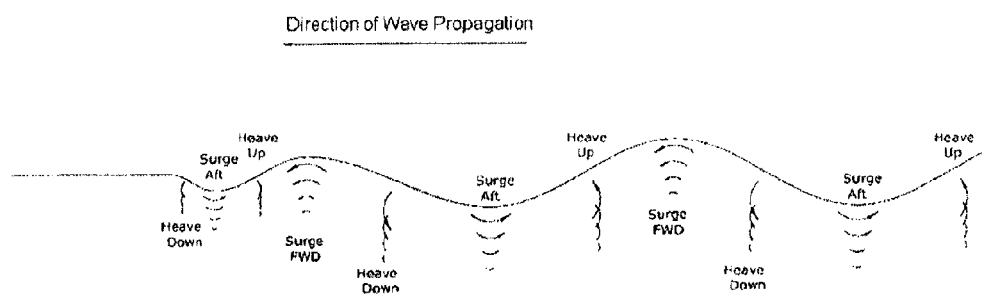
FIG. 3 is a schematic illustrating orbital particle motion in waves propagating from calm seas.

FIG. 1 illustrates a preferred embodiment of the Wave Energy Converter of the present invention suitable for offshore deployment. Wave Energy Converter 101 (hereafter referred to as WEC), is comprised of at least one forward pontoon 102, and a rear pontoon 103. In some embodiments, the rear pontoon 103 may comprise a central pontoon 104 immovably fixed to at least one outrigger pontoon 106. Forward pontoon 102, is pivotably attached to the rear pontoon 103 by way of drive arm 105. Drive arm 105 is attached to rear pontoon at points 111, and to forward pontoon at point 112. Drive arm 105 forms part of a power take-off (PTO) system as will be described in more detail below.

Forward pontoon 102 is preferably long and slender in dimension, such that its elongate axis may be aligned—when in use—parallel to the crest of oncoming waves (consistent in orientation with the X axis of FIG. 1), and perpendicular to the waves' direction of propagation (consistent in direction with the Y axis of FIG. 1). Such an alignment maximises the extent to which the forward pontoon 102 engages with the waves. It will be appreciated that forward pontoons of varying dimensions may be used depending on the prevailing characteristics of the waves at a given site. In particular, the width 109 of the forward pontoon along its elongate axis may be varied so as to provide the optimal captive width corresponding to the prevailing wave crest length in a given environment. It will be appreciated that for sites where the prevailing conditions are characterized by short-crested waves, the width 109 of the forward pontoon may be narrowed accordingly, whereas for sites where the prevailing conditions are characterized by longer-crested waves, the width 109 of the forward pontoon may be suitably widened. It will be further understood that for sites where the prevailing wave crest length is particularly long, engineering and economic limitations may prohibit the implementation of a single device of corresponding size, and instead, multiple devices of lesser size may be deployed side by side.

The forward pontoon 102, and the connection of the drive arm 105, is designed so that—when in use—the absolute position of the forward pontoon 102 may change primarily along its Z-axis as it responds to oncoming waves, rising and falling on wave crests and troughs respectively. This is a mode of motion commonly known as heave. It can be seen that the drive arm 105 is fixed relative to the forward pontoon 102 but pivotally connected to the rear pontoon 103, so that as the forward pontoon 102 heaves up and down the rear pontoon 103 has the freedom to move in a different mode of motion, namely pitching.

The rear pontoon 103 may comprise a single solid pontoon, or a central pontoon 104 with one or more fixed outrigger pontoons 106. The rear pontoon 103 may also comprise a hollow tank, as is described below. Preferably, the dimensions of the rear pontoon 103 are such that—when in use—it remains at a relatively static point on its axes, with peaks and troughs of waves causing the rear pontoon 103 to primarily rotate about its X-axis as illustrated by arrows 107. This motion is known as pitching. To allow this, the length of the rear pontoon 103 (the dimension of the pontoon that is perpendicular to the wave crest when in use) may be substantially greater than the corresponding length of the forward pontoon 102.

By adjusting the dimensions and the physical characteristics of the components of the WEC and their positions relative to one another, the overall response of the WEC to waves—when in use—may be such that it approaches the peak frequency of the incident wave regime at that site, thus causing a resonant response which is a most desirable state for power capture from the waves. The WEC may therefore be "tuned" to the prevailing frequency of the wave motion to which it is subjected during use. Accordingly, the preferred dimensions of the WEC may be regarded as site specific. In addition to the variation in forward pontoon width as described above, the total length 108 of the WEC (the total dimension of the device in the direction perpendicular to the wave crest when in use) may also be dictated by the prevailing wave characteristics of a specific site. The prevailing wavelength ($\lambda$) at a given site is a particularly significant determining factor in this regard. The total length of the WEC will preferably be between $0.5\lambda$ and $\lambda$, or between $0.6\lambda$ and $1.1\lambda$. The impact of this is that where wave regimes are less energy dense, the capital cost of the device is automatically reduced and may therefore still be capable of extracting the energy cost effectively. By selecting the overall length of the device such as the position of the first pontoon and/or the aft pontoon, the overall response of the WEC to incident wave frequency (or period) can be greatly improved, resulting in better energy capture.

Because the forward pontoon 102 responds to waves primarily by heaving, while the rear pontoon 103 may respond primarily by pitching, the extraction of wave energy by the WEC is by means of the combined heave and pitching motion of the pontoons, i.e. two different modes of motion. When the dimensions of the WEC are configured appropriately for the prevailing wave characteristics at a site, these two motions will work antagonistically, harnessing more energy and resulting in an efficient wave energy machine. This efficiency may be increased by complementing this arrangement with a power take-off (PTO) system connected to the drive arm 105 comprising components suitable for use in this context, such as the single stage, reciprocating, high pressure, raw seawater pump described below.

A first embodiment of the WEC and a complementary PTO when in use will now be described. FIG. 2a illustrates the first step in this process, as a wave of appropriate wavelength 201 interacts with the device 200. A wave crest 209 at the forward pontoon 202 and another wave crest 211 at the rear outrigger portion 206 of the rear pontoon 203 causes these two portions to be raised relative to the central portion of the rear pontoon 204, which rides in a wave trough 212 between the crests 209, 211. This leads to an aft stroke 213 of the pump 207 via con rod 208. The rising of forward pontoon 202 can be viewed primarily as a heaving motion as illustrated by arrow 214. The tilting of rear pontoon 203 may be regarded primarily as a pitching motion as illustrated by arrow 215.

FIG. 2b illustrates what happens as the wave crest 209 propagates further. The central portion 204 of the rear pontoon 203 is raised while the forward pontoon 202 and the rear outrigger portion 206 of the rear pontoon 203 fall into wave troughs 212, 217 respectively. This leads to a forward stroke 216 of the pump 207 via con rod 208. The outrigger portion 206 acts as a lever to augment movement of the central portion 204 of the rear pontoon 203. It is believed that the forward pontoon 202 helps to stabilise the rear pontoon 203 so that the latter is locked into a pitching mode of motion and better able to achieve a resonant frequency.

As can be seen in FIGS. 2a and 2b, the motion of the two pontoons 202, 203 relative to one another in the two different modes of motion is preferably converted into a turning moment, which may be used to drive a power take off system 207, preferably situated on rear pontoon 203, operation of which is discussed later. By having two linked bodies designed to operate in different modes of motion and in different phases; for instance one primarily in a heaving mode and the other primarily in a pitching mode, more efficient wave energy capture is possible. As discussed above, it is proven that it is not possible to capture more than 50% of the wave energy if a single mode of motion is used. The present device harnesses more than one mode of motion and so up to 100% capture is theoretically possible. This is because the two bodies both capture energy from the waves and can be designed such that motions are out of phase as well as being of different modes.

Due to the orbital nature of water particle motion in sinusoidal, oceanic, deep water swells, there is an horizontal (or "surging") component of power, equivalent in magnitude to the vertical component already discussed. FIG. 3 illustrates the direction of particle motion throughout the various stages of the wave cycle, as waves begin to propagate. Any floating body with sufficient bluff area to interact with this surging component will translate with respect to a fixed reference. It will therefore be appreciated that other motions could also be harnessed by the device in order to provide an efficient wave energy conversion system. While the embodiment of the invention as described in FIG. 2 indirectly harnesses the surging mode in addition to reliance on pitch and heave motions, other embodiments of the invention may more directly utilize this motion. For instance, the rear pontoon may be configured to respond primarily by surging, or by a combination of pitching and surging, and the forward pontoon could equally be designed to be sensitive to surging motions. Furthermore, the rear pontoon 203 seen in FIG. 2 may respond by heaving in addition to or instead of the pitching and/or surging modes of motion.

An alternative embodiment of the invention, which more directly targets the surge mode of motion in addition to pitching and heaving will now be discussed in relation to FIGS. 4a-d. As is the case with the embodiment discussed with reference to FIG. 2, the configuration of this embodiment will be based on local bathymetry and wave regimes. Furthermore, it will be most effective in sinusoidal deep ocean wave regimes, where the orbital shape is truly circular. For ease of reference, the power take off systems utilized in this context have been omitted from the diagram.

To directly target the surge mode, a second degree of freedom must be factored into the linkage between forward pontoon 402 and rear pontoon 403. Specifically, a horizontal translation is required to allow forward pontoon 402 and rear pontoon 403 to move closer together and further apart relative to one another. This linkage can take the form of parallel linkages 420 or alternatively a rolling carriage (not shown). In the event parallel linkages are provided for, two separate PTO systems may be relied upon—one each for both of the linkage components. Since there is no natural spring in the surge mode, such as that provided through the buoyancy force in heave, a mechanical restoring force must be provided. This spring mechanism can take the form of a mechanical spring, hydrostatic accumulators or a pendular inertial mass.

FIG. 4a depicts this embodiment of the WEC device as forward pontoon 402 falls into a wave trough 430, and is thus operating primarily in heaving mode, as illustrated by arrow 421. At the same time, central portion 404 of rear pontoon 403 rides on a wave crest 431, while outrigger portion 406 is also in a wave trough 432. This causes rear pontoon 403 to pitch, and the relative pitching and heaving is converted into a force 440 at the first PTO connected to the first linkage part 441.

FIG. 4b depicts the subsequent step in the cycle where the horizontal, surging forces of the orbital motion imparted to the forward pontoon 402 and the central portion 404 of the rear pontoon are directly opposed. This occurs as the forward pontoon has passed through the wave trough 430, and as the central portion 404 of the rear pontoon 403 has passed through wave crest 431. At this point, the surge forces 451 acting on forward pontoon 402 are driving it in the direction opposite the surge forces 452 acting on the central portion 404 of the rear pontoon, and this motion is converted into a force 443 at the second PTO connected to the second linkage part 442.

FIG. 4c illustrates the stage of orbital motion opposite that illustrated in 4a, whereby the WEC components are in the position opposite their positioning in 4a. The forward pontoon is once again primarily experiencing heave as it rises on wave crest 433, while rear pontoon 403 is pitching in the direction opposite that set out in 4a, due to the fact that it is now the central portion 404 of rear pontoon which is in wave trough 430, while outrigger portion 431 is on wave crest 431. This action is converted into force 444 at the first PTO connected to the first linkage part 441. This force is in the direction opposite the force 440 depicted in FIG. 4a.

FIG. 4d illustrates the final stage in a single iteration of the orbital motion cycle. In FIG. 4d, it is once again surge forces that are the primary force being harnessed by the device. The motions of the forward and rear pontoons at this point are the opposite of those set out in FIG. 4b, and result in force 445 being delivered to the second PTO connected to the second linkage part 442. Force 445 is in the direction opposite the force 442 depicted in FIG. 4b.

As is apparent from the FIGS. 4a-d, the optimal relative horizontal translation occurs as the forward pontoon 402 is rising upon the crest of a wave and the central portion 404 of the rear pontoon 403 is in a trough (and vice versa). The horizontal components of the orbital motion at this point of the wave cycle are directly opposed. The shape of the outrigger portion 406 of the rear pontoon 403 must be optimised in this configuration so as not to impinge on the rear pontoon's tendency to oppose the forward pontoon. The outrigger portion 406 therefore maintains its function as a lever in heave, but plays a less significant role in surge. In such embodiments energy can be extracted from the additional surging mode of motion as well as from the relative heaving and pitching, thereby increasing the number of contributions to the power response of the device.

In order to ensure that a WEC device absorbs the maximum amount of wave energy, the system should have a mechanical impedance such that it exhibits a resonant or near resonant response to oncoming waves. This mechanical impedance is made up of two components, reactance and resistance. By minimising the reactance component, the resistance component of the mechanical impedance of the system may be optimised. In addition, the mechanical resistance of the system may also be independently optimised. This is desirable because it is the resistance component from which the wave energy may be extracted.

The reactance component of the mechanical impedance of the WEC may be minimised in two ways. Firstly, as described above, the dimensions of the WEC may be adjusted such that—when in use—its response to incident waves approaches the peak frequency of the incident wave regime at that site.

Figure 5:
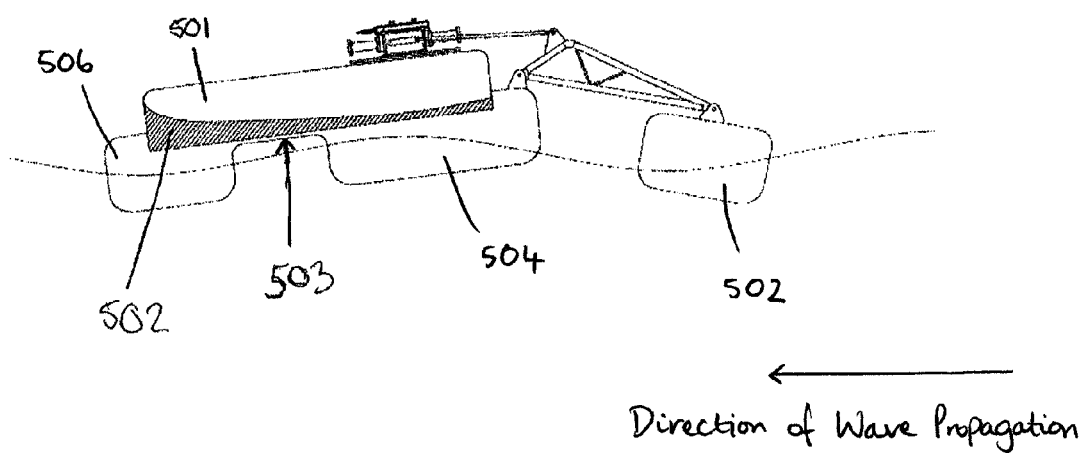
FIG. 5 is a cross-sectional side view of the Wave Energy Converter of FIGS. 1 and 2, illustrating the Motion Control Tank.

Secondly, and as shown in FIG. 5, the rear pontoon 503 may preferably comprise a Motion Control Tank 501. This tank is comprised of a watertight cavity within the rear pontoon 503. When the WEC is in use, the tank, which can house varying volumes of liquid 502, may allow a faster tuning response to the incident wave regime. The dimensions of the tank and the optimum water level in the tank are critical to system response. It will be appreciated that the outrigger portion 506 of the rear pontoon 503 may be separate from the central portion 504 and either or both of the outrigger and central portions 504, 506 may comprise a liquid tank to provide motion control.

The Motion Control Tank allows the controlled transfer of liquid 502 along the length of the rear pontoon 503 and allows a time varying control of the pitch characteristics of the rear pontoon as a whole. By tuning the motion of the liquid 502 in the tank 501, some of the pitching and/or surge motion of the rear pontoon can be converted to an inertial resistive input to the forward pontoon's heave motion. The Motion Control Tank can also be used to broaden the bandwidth of the power absorption response of the device, thus minimising reactance over a wider range of sea states.

The motion control tank must be optimised in terms of size and position when using the surge mode configuration of FIGS. 4a-d in order to time the inertial input of the standing wave to coincide with the correct heave mode position, while not detracting from the surge mode.

The mechanical resistance of the system may be independently optimised by the deployment of a PTO system suitable for such a context. It continually optimises the mechanical resistance of the WEC by way of a mechanical resistance optimisation component herein referred to as the Constant Pressure Variable Moment system, or CPVM. The PTO as described herein also performs a further distinct but complementary function. It effectively transmits the converted energy into a usable form by way of a reciprocating, single-stage, high pressure hydraulic pump.

When the WEC is in use, the CPVM constantly monitors the extant wave regime and adjusts the device response to that wave regime. This ensures dynamic optimisation of the mechanical resistance in the WEC and also ensures that while varying amounts of energy are extracted from a wave at different points over its period, a constant, uniform input force is delivered to the pump, resulting in a constant, uniform pressure at the pump outlet.

Figure 6A:
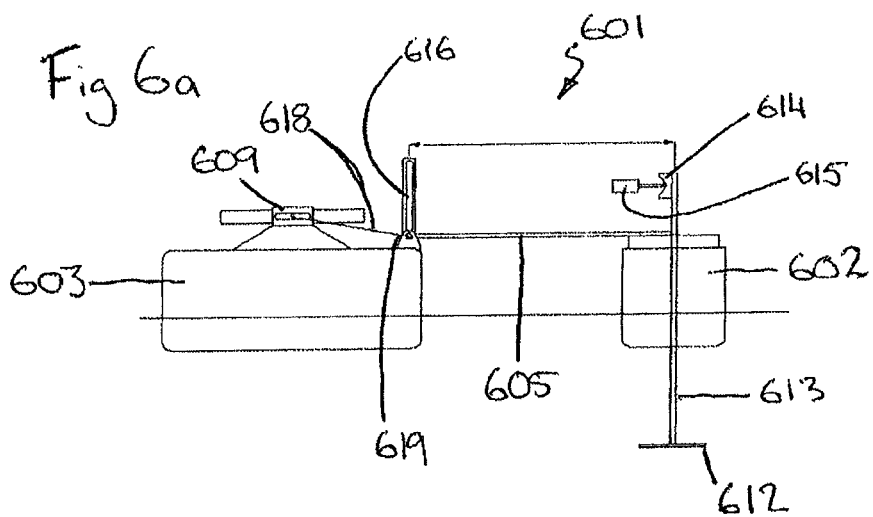
FIGS. 6a-c are cross-sectional side views of a dynamically adjustable Power Take Off system according to an embodiment of the present invention.
Figure 6B:
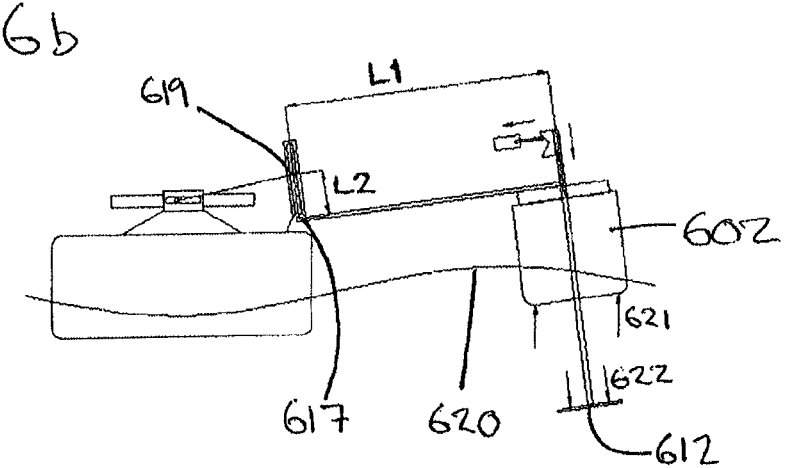
Figure 6C:
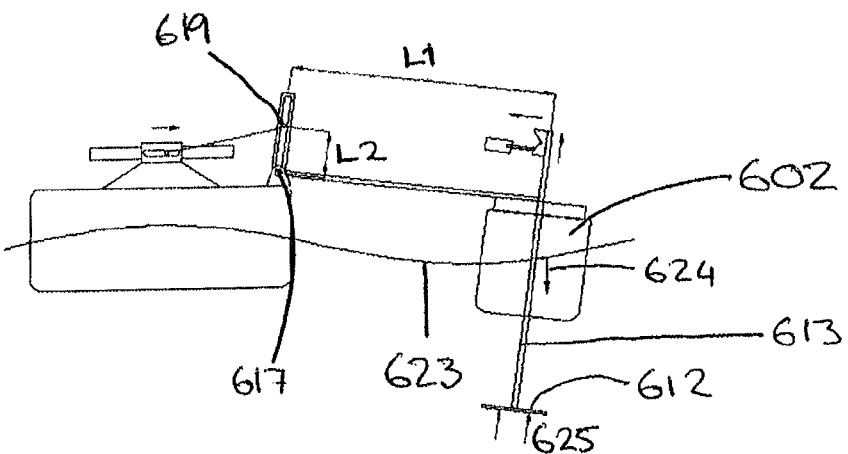

FIGS. 6a-c depict one embodiment of the CPVM in use. This mechanical CPVM system 601 comprises a drag plate 612 affixed to one end of a CPVM camshaft 613. As can be seen, the camshaft 613 is movably attached to the forward pontoon 602 such that when the WEC is in use, the elongate axis of the camshaft is substantially perpendicular to the sea surface, with the camshaft being free to move relative to the forward pontoon 602 along its elongate axis. A cam plate 614 is attached to the camshaft 613 at the end opposite the drag plate 612. The cam plate 614 features an uneven control surface that is configured to interact with a control valve 615, such that movement of the camshaft 613 relative to the position of the forward pontoon 602 also moves the cam plate 614 relative to the control valve 615. This results in the uneven control surface of cam plate 614 exerting a varying degree of influence on the control valve 615. The varying degree of influence on the control valve 615 triggers a corresponding varying degree of movement at a lever slide 616. This triggering may be effected in a number of ways, such as by way of an hydraulic, single acting, linear actuator (not shown) connected to both control valve 615 and lever slide 616. Lever slide 616 is attached to drive arm 605 close to, or at its pivot point with rear pontoon 603. It is arranged perpendicular, or substantially perpendicular to drive arm 605, and is also rotatably attached to con rod 618 at a point 619 that may be varied along its length. Con rod 618 in turn drives the pump 609. Because the point of attachment between lever slide 616 and con rod 618 is variable, this in turn means that the turning moment generated by motion of forward pontoon 602 relative to rear pontoon 603 may be translated into a pump stroke that is also variable in length.

FIG. 6a illustrates the WEC at rest. The drag plate 612 is at rest and therefore so is cam plate 614 and control valve 615. The lever slide 616 is in the zero lever position, so con rod 618 is not acting on the pump 609.

FIG. 6b illustrates heaving of the forward pontoon on a crest of a wave. The wave crest 620 exerts a buoyancy force 621 on the forward pontoon 602. Since the drag plate 612 is located beneath the wave influence, a drag force 622 is exerted on the drag plate 612. This pulls the cam shaft 613 and consequently the cam plate 614 down relative to the forward pontoon 602 and the control valve 615. The result of the movement of the uneven control surface of the cam plate 614 relative to the control valve is that cam plate 614 exerts a linear push on the control valve 615. This mechanical signal is transferred via the control valve (such as by way of an hydraulic single acting actuator) into a translation force delivered to the lever slide 616. The extent of the translation is proportional to the control valve 615 translation, and therefore proportional to the power available at that precise point in the incident wave.

In FIG. 6c, the wave trough 623 allows a gravitational pull 624 to act on the forward pontoon 602. Drag plate 612 experiences resistance 625 to movement in a similar direction, with the net effect being that cam shaft 613 moves relative to forward pontoon 602 in the direction opposite to its direction of movement as shown in FIG. 6b. Consequently, cam plate 614 also moves relative to control valve 615 in a direction opposite that shown in FIG. 6b. Due to the uneven shape of the control surface of the cam plate 614 (which in one embodiment is a notched shape), this also leads to a mechanical push on control valve 615 and a corresponding translation force being delivered to lever slide 616.

Where conditions allow and where electrical power is the target WEC output, an electronic version of the CPVM can be used. It will be appreciated that this may be achieved in a number of different ways. For example, an optical encoder may be deployed at the pivot point between drive arm 605 and rear pontoon 603, and used to generate the required translation signal. Alternatively, a strain gauge in the arm linkage may be utilized. A solenoid operated proportional valve can then control the linear actuator delivering the translational force to the lever slide 616.

It can be therefore seen from FIGS. 6a-c that the position of forward pontoon 602 at changing points along the wave period as the wave propagates will generate signals of a variable magnitude. These signals in turn are converted into translational forces such that the greater the signal, the more the point of connection 619 between con rod 618 and lever slide 616 will move relative to the point of connection 617 between drive arm 605 and lever slide 616. As this length between points on the lever slide (designated L2 in FIGS. 6b and 6c) varies, so too does the ratio of L1:L2 (L1 being the length of the drive arm 605). In the event that the forward pontoon moves over a crest or into a trough at a comparatively substantial velocity, a comparatively strong signal will be generated as it does so, causing a comparatively substantial increase to the lever slide inter-point length (L2). The consequent decrease in the ratio of L1:L2 results in an increase in pump stroke length. As such, the CPVM system can detect variations in the angular velocity of the rotation of drive arm 605 about rear pontoon 603, and can dynamically adjust the line of action of the drive arm 605—lever slide 616—con rod 618 linkage such that optimal damping resistance is maintained. It also means that constant input force is maintained at the pump 609, resulting in a constant pump output pressure. Constant pump output pressure is a highly desirable feature for efficient use of the captured energy, whether as a feed for a Reverse Osmosis Plant (for the purposes of desalination), as a feed for a water turbine (such as a Pelton Wheel) for electricity generation, or for pumped hydroelectric storage.

In the foregoing embodiments described with respect to FIGS. 1 to 6, the direction of wave propagation has been shown to be incident on the smaller "forward" pontoon 102, 202, 402, 502, 602 before the waves reach the larger "rear" pontoon 103, 203, 403, 503, 603. However, in other embodiments it is envisaged that the previously described "forward" pontoon, relative to the incident wave direction, may in fact be the aft pontoon in a reverse configuration of the WEC. It has been found that in such a configuration the larger forward pontoon 103, 203, 403, 503, 603 may be tuned such that its mode of motion is in phase with the oncoming waves and has a frequency matching that of the waves so as to achieve a resonant excitation, with the smaller aft pontoon 102, 202, 402, 502, 602 acting as a stabiliser for this motion. The orientation of the WEC relative to the prevailing direction of wave propagation can be adjusted using a suitable mooring system.

Figure 7:
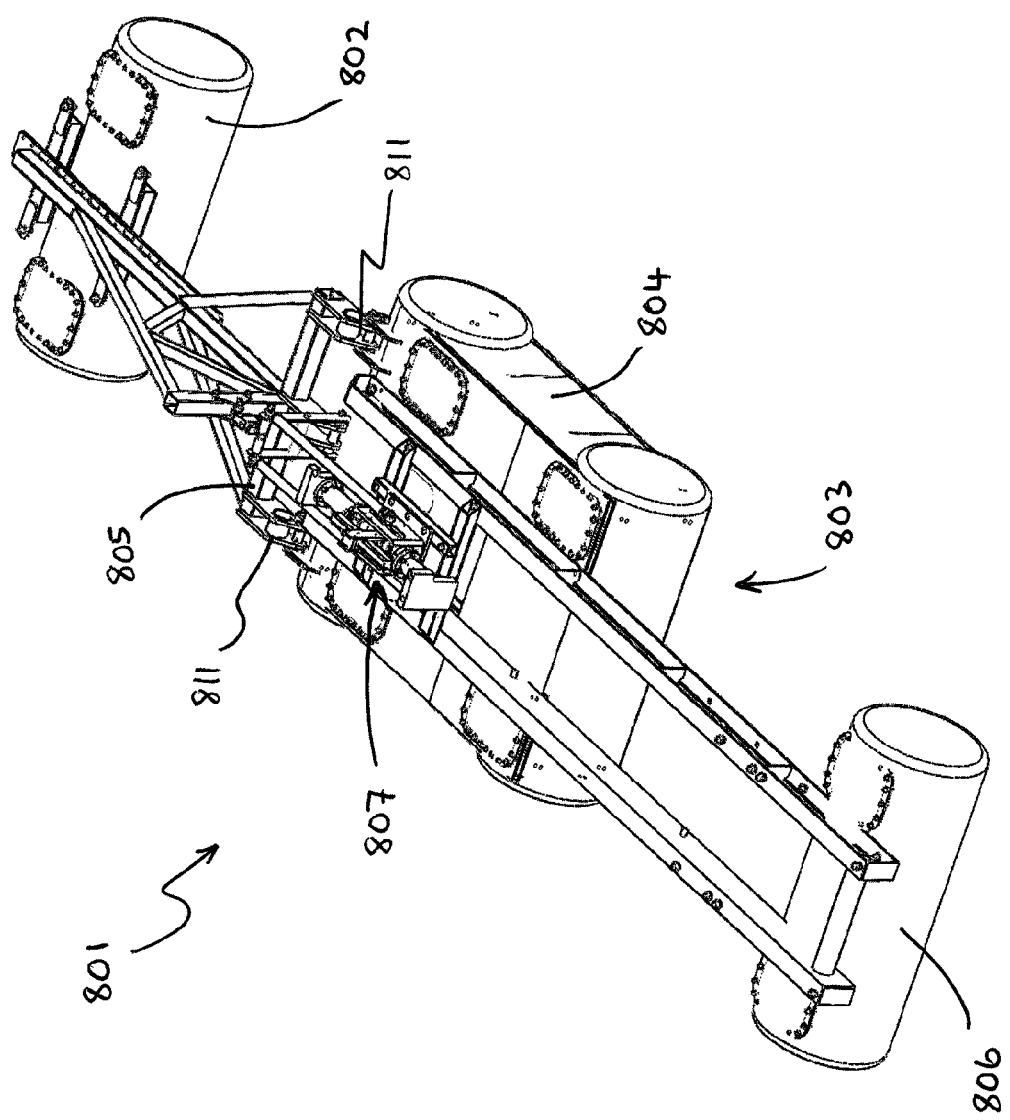
FIG. 7 is a perspective view of a Wave Energy Converter according to a further embodiment of the present invention.

The Wave Energy Converter seen in FIG. 7 has the same basic configuration as the devices shown in FIGS. 1-2 and 4-5 and thus will not be described in great detail. However it can be seen that in this device the pontoons have a cylindrical shape rather than a raft-like shape with a rectangular cross-section. As a result of the circular cross-section the drag losses of the pontoons while in motion can be minimised. Furthermore, cylindrical sections permit optimum ratios of body mass and buoyancy stiffness. In this embodiment the Wave Energy Converter 801 is also comprised of an outlying "hammerhead" pontoon 802 and a main pontoon 803 comprising a central portion 804 and an outrigger pontoon 806. Hammerhead pontoon 802 is pivotably attached to the main pontoon 803 by way of a drive arm 805. The drive arm 805 is attached to the main pontoon 803 at hinge points 811. It can be seen that a power take-off system in the form of a pump 807 is mounted on top of the main pontoon 803.

Figure 8:
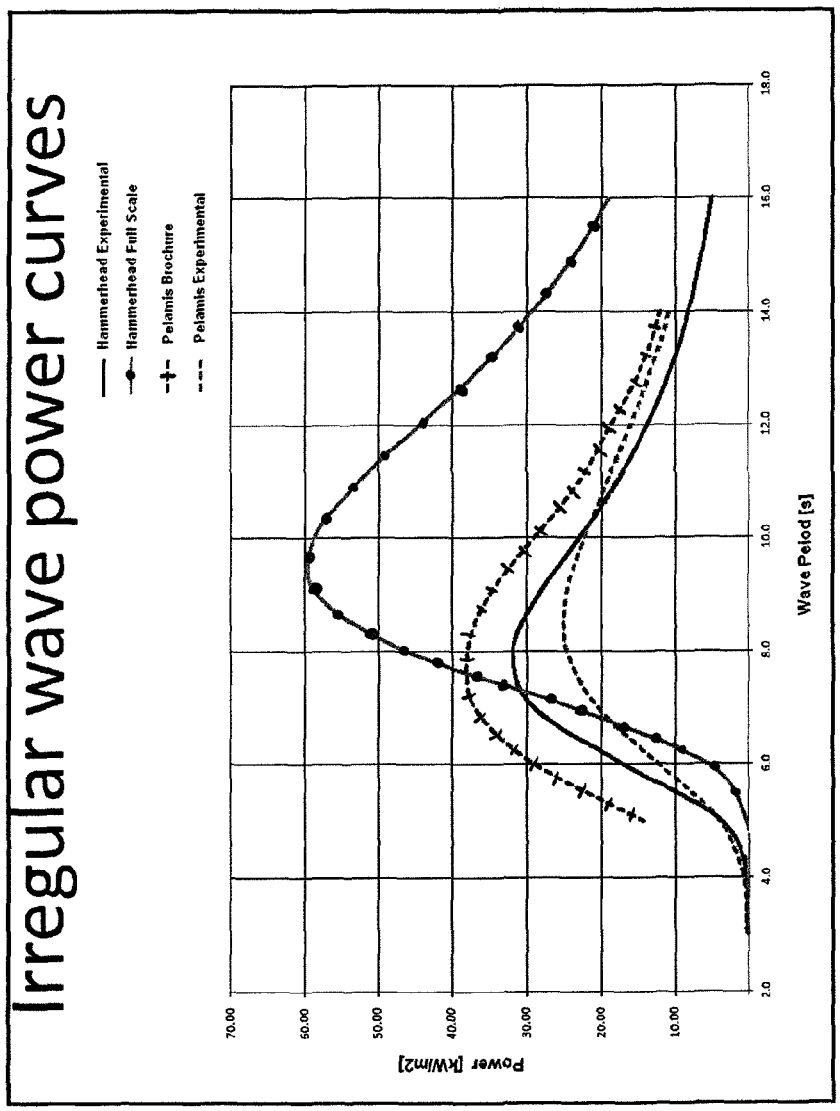
FIG. 8 shows the irregular wave power curves for a "Hammerhead" Wave Energy Converter according to embodiments of the invention as compared to a Pelamis device.

The performance of a "Hammerhead" WEC of the type seen in FIG. 7 is shown in FIG. 8 in comparison with the power response of a Pelamis device. It can be seen that the Hammerhead device provides an increased power output across a large range of wave periods (frequencies). The improved power output can be attributed to the ability of the Hammerhead device to extract energy from at least two different modes of motion rather than relying on a single mode of motion.

FIG. 9 depicts a single stage, reciprocating, high pressure, fluid pump suitable for pumping raw sea water that may be used in the in one embodiment of the PTO of the invention. Pump 701, comprises a pair of fluid suction legs 702, 703, a double-acting plunger 704 and a fluid outlet manifold 705. Each suction leg comprises a fluid inlet 706, 707, a pump chamber 708, 709, an outlet conduit 722, 723, a suction check valve 710, 711, a delivery check valve 712, 713, a vacuum chamber 714, 715 and an accumulator chamber 716, 717. It will be understood that the volumetric capacity of the two legs may be identical, as may be the corresponding components in each leg.

The configuration of parts of both suction legs 702, 703 will now be described with respect to suction leg 702. With respect to suction leg 702, the inlet 706 is in fluid communication with the vacuum chamber 714. The inlet 706 also communicates with pump chamber 708 via suction check valve 710, such that the inlet 706 and the pump chamber 708 may be in fluid communication when the suction check valve 710 is open, but not when it is closed. When the pump is active, the inlet 706 and the pump chamber 708 may be in episodic fluid communication with one another. The pump chamber 708 is also in communication with outlet conduit 722 via delivery check valve 712, such that the pump chamber 708 and the outlet conduit 722 may be in fluid communication when the delivery check valve 712 is open, but not when it is closed. When the pump is active, the pump chamber 708 and the outlet conduit 722 may be in episodic fluid communication with one another. The outlet conduit 722 is also in fluid communication with accumulator chamber 716 and with fluid outlet manifold 705. It should be clear that the configuration of parts for suction leg 703 is analogous in fashion.

FIG. 9 depicts how the double-acting moveable plunger has a first end 718 which protrudes into the first pump chamber 708 through an aperture in chamber wall 720, and a second end 719 which protrudes into the second pump chamber 709 through an aperture in chamber wall 721. The plunger 704 and chambers 708, 709 are configured to ensure that a watertight seal exists at all times between the plunger body and the mouths of the apertures in walls 720, 721 during movement of the plunger 704.

The first and second pump chambers 708, 709 may be situated in separate housings and may by carried by a frame made from a suitably robust material, such as steel. In a preferred embodiment, the plunger 704 may be plasma coated using a tungsten carbide material. The coating may be applied by way of a well-established spray-coating process. Such a coating is advantageous because it results in very low frictional losses at the seals. Furthermore, it provides corrosion and erosion resistance to the effects of saltwater and waterborne debris, and is capable of resisting localised impact. Preferably, the plunger is also machined to a high dimensional tolerance and surface finish and may be manufactured from a suitable material such as high quality stainless steel.

Figure 10A:
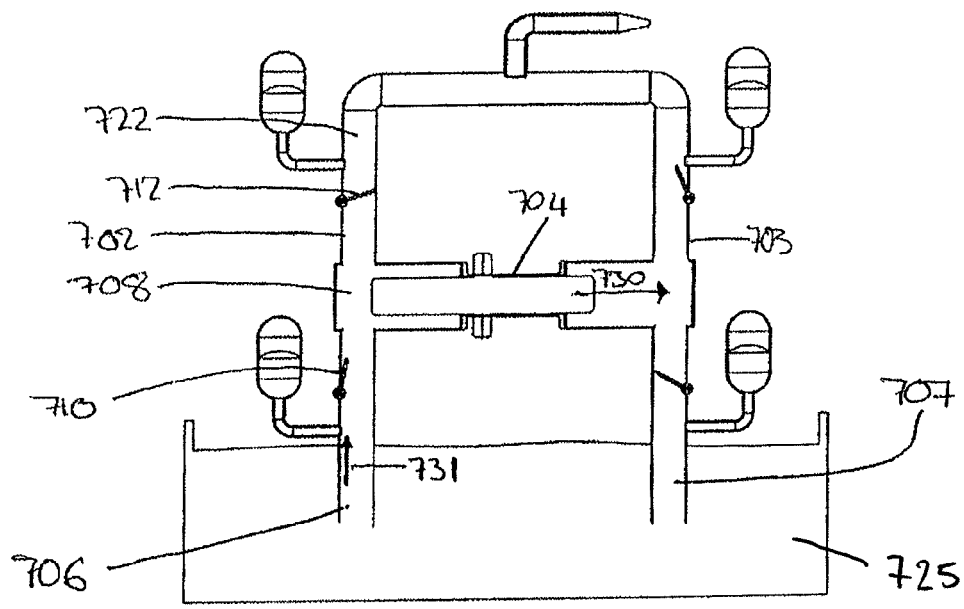
FIGS. 10a and 10b are a series of cross-sectional side views of the pump of FIG. 9 depicting the flow path of fluid when the pump is in use.
Figure 10B:
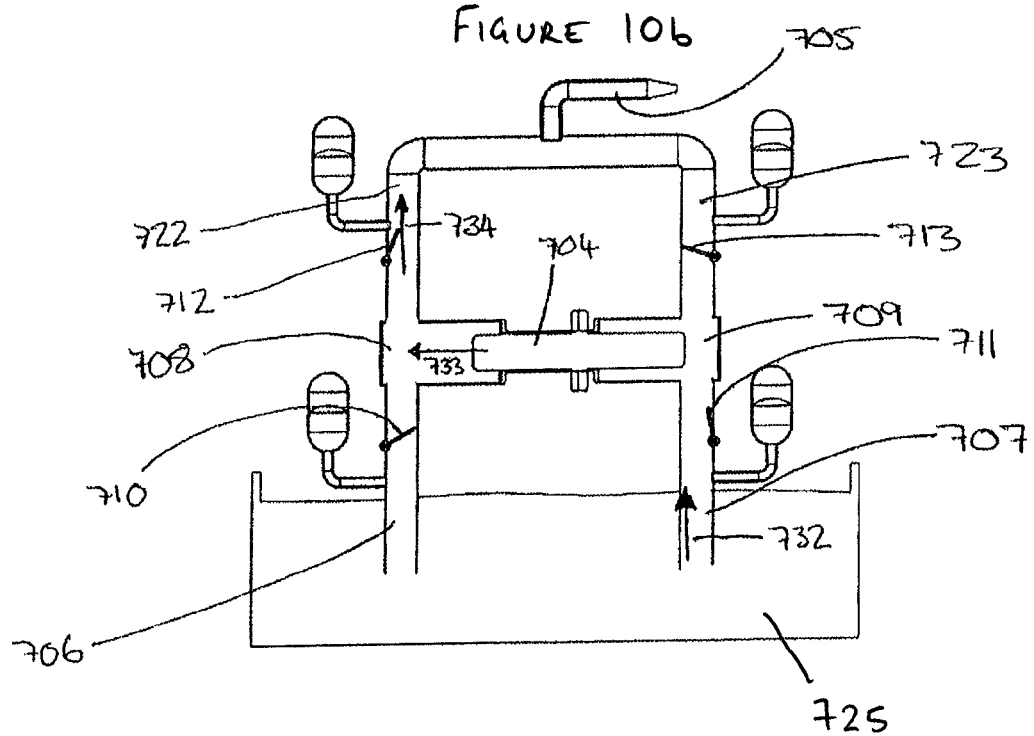

In use, inlets 706 and 707 of suction legs 702 and 703 of the pump 701 are in fluid communication with a body of fluid 725, as shown in FIGS. 9, 10a and 10b. FIG. 10a depicts the configuration of the pump 701 at the beginning of a first stroke, with the plunger 704 protruding further into pump chamber 708 than pump chamber 709. As force is applied to the plunger 704 so that it moves in the direction as indicated by the arrow 730, the capacity of pump chamber 708 increases. This creates a suction effect that causes suction check valve 710 to open and fluid to be drawn up inlet 706 in the direction as indicated by the arrow 731. This suction effect may also contribute to ensuring that delivery check valve 712 is closed during this time, thereby ensuring that the suction effect does not also draw fluid from outlet conduit 722. At the end of the first stroke, the plunger 704 protrudes further into pump chamber 709 than pump chamber 708. At this point, a body of fluid resides within inlet 706 and pump chamber 708. At the end of the first stroke there may be a momentary pause before the return stroke begins.

Upon the return stroke, as depicted in FIG. 10b, the plunger 704 moves in the direction as indicated by the arrow 733 and fluid is drawn up inlet 707 into pump chamber 709 in a direction as indicated by the arrow 732 in an analogous fashion to the fluid flow described for inlet 706 and pump chamber 708 in FIG. 10a. The return stroke also has the effect of reducing the capacity of pump chamber 708 such that the body of fluid residing therein is placed under increased pressure. This increased pressure drives a volume of fluid out of the pump chamber 708. Fluid is prevented from being driven through inlet 706 due to suction check valve 710 preventing flow in this direction. However, the fluid is instead driven through delivery check valve 712 into the outlet conduit 722 and subsequently the fluid outlet manifold 705.

As the plunger 704 begins a further stroke (again in the direction indicated by arrow 730), the newly drawn-in fluid residing in pump chamber 709 is driven though delivery check valve 713, outlet conduit 723 and subsequently fluid outlet manifold 705 in a manner analogous to that described in the preceding paragraph. In this way, the oscillatory pumping motion may be converted into a unidirectional output flow.

It should be noted that FIGS. 10a and 10b do not illustrate fluid flow into and out of vacuum chambers 714, 715 and accumulator chambers 716, 717 while the above-described process is taking place. This detail will be illustrated with respect to FIGS. 11a and 11b and 12a and 12b below.

Figure 11A:
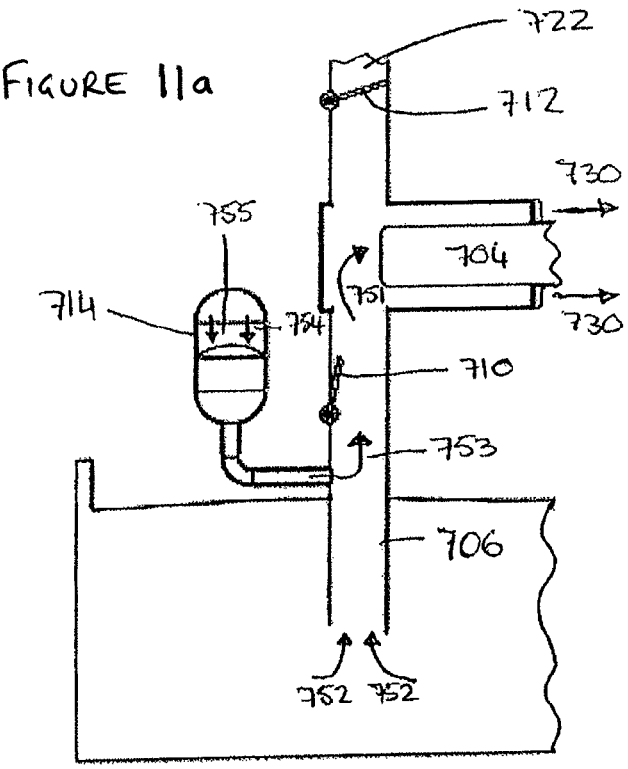
FIGS. 11a and 11b are cross-sectional side views of the vacuum chamber and one suction leg of the pump, depicting the flow path of the fluid into and out of the vacuum chamber as the pump is being used.
Figure 11B:
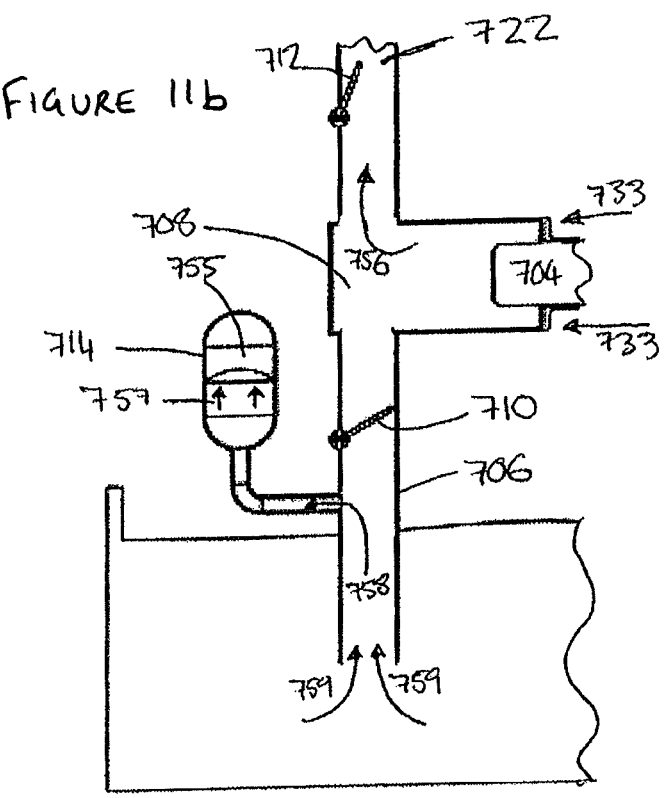

FIGS. 11a and 11b illustrate fluid flow into and out of vacuum chamber 714 while the pump is in action as depicted in FIGS. 10a and 10b. In FIG. 11a, as plunger 704 begins to move in the direction as indicated by the arrow 730, the capacity of pump chamber 708 begins to expand. The resulting suction effect draws fluid up through inlet 706 in direction 752 and into pump chamber 708 via suction check valve 710 as depicted by arrow 751. The resulting suction effect also causes fluid to be drawn out of vacuum chamber 714 as depicted by arrow 753. The vacuum chamber 714 may contain a partial vacuum 755, and fluid is drawn out of the vacuum chamber 714 in this way because the force exerted by the partial vacuum 755 may be weaker than the suction force exerted by the plunger 704 moving in direction 730. As a result, the level of fluid in vacuum chamber 714 drops, as depicted by arrows 754.

Upon the return stroke 733 of the plunger 704 as depicted in FIG. 11b, the decrease in capacity of pump chamber 708 drives a flow of fluid into outlet conduit 722 via delivery check valve 712 as depicted by arrow 756. Concurrently, the suction check valve 710 closes, due in part to the force of the fluid being driven from pump chamber 708. Plunger-driven suction uptake of fluid via inlet 706 also ceases at this stage. However, fluid continues to be drawn through inlet 706 (as depicted by arrows 759) and into vacuum chamber 714 as depicted by arrow 758. This occurs due to the partial vacuum in vacuum chamber 714 and also due to the momentum of the fluid in the inlet 706, which was imparted during the plunger stroke described in FIG. 11a. As a result, the fluid level in vacuum chamber 714 rises. Once the plunger 704 has ceased to move in this direction, the process as depicted in FIG. 11a begins again.

In this way, the velocity of the body of fluid through inlet 706 (and, analogously, through inlet 707) may be relatively constant, regardless of the direction of the plunger stroke. As a result, less energy is spent accelerating the body of fluid at the beginning of each stroke. Furthermore, a more even flow velocity results in much smaller velocity peaks, and therefore much lower frictional losses. If vacuum chambers 714, 715 are tuned correctly, the oscillations of the fluid columns contained therein in, are timed to coincide with the suction strokes of plunger 704 and this therefore leads to increased pump efficiency. Frictional losses may be further reduced by providing the plunger 704 with a plasma coating.

Figure 12A:
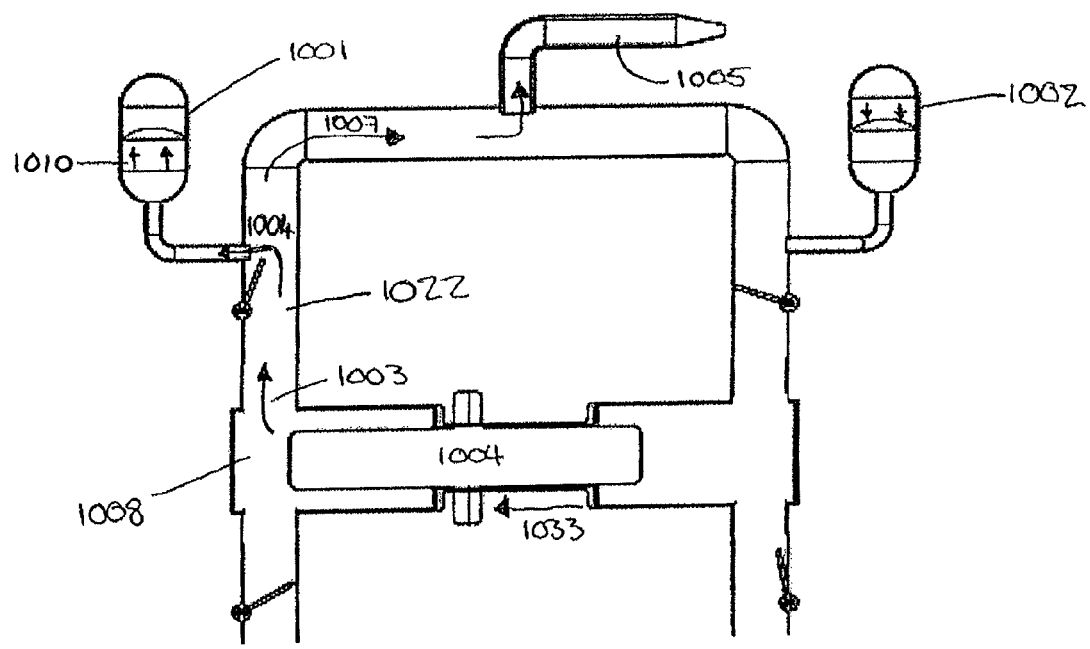
FIGS. 12a and 12b are cross-sectional side views of the hydraulic accumulator and one suction leg of the pump, depicting the flow path of the fluid into and out of the accumulator as the pump is being used.
Figure 12B:
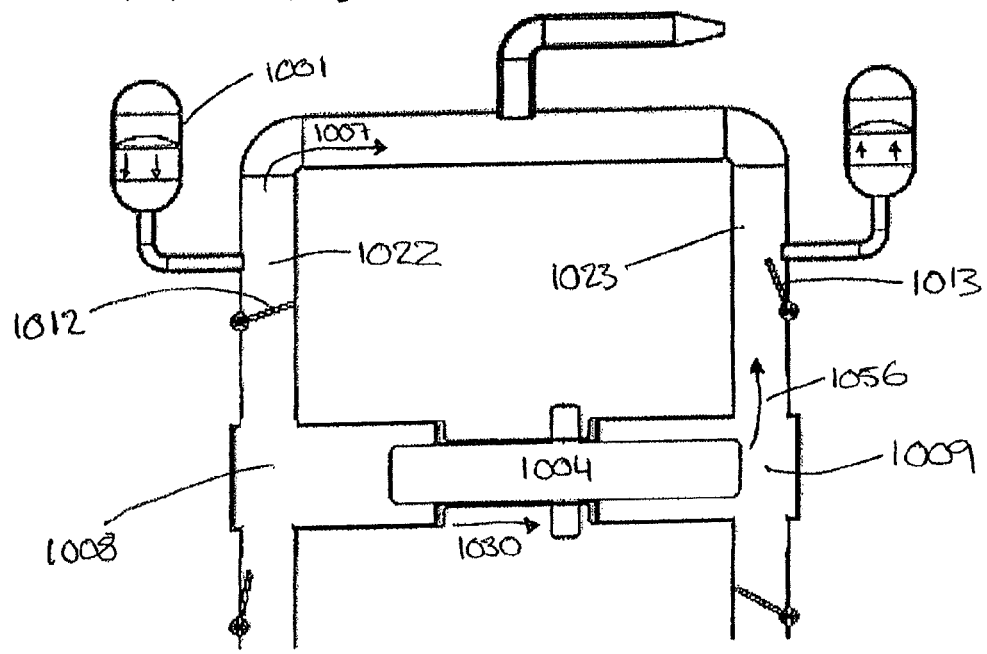

FIGS. 12a and 12b illustrate fluid flow into and out of accumulator chambers 1001, 1002 while the pump is in action as depicted in FIGS. 10a and 10b. In FIG. 10a, as plunger 1004 begins to move in the direction as indicated by the arrow 1033, the capacity of pump chamber 1008 begins to contract. The resulting pressurization effect propels fluid up through outlet conduit 1022 in direction 1003 and on into fluid outlet manifold 1005 as depicted by arrow 1007. This resulting pressurization effect also causes fluid to be forced into accumulator chamber 1001 as depicted by arrow 1004. The accumulator chambers 1001, 1002 may be partially pressurized, and fluid is forced into the accumulator chamber 1001 in this way because the force exerted by the partial pressurization in the accumulator chamber 1001 may be weaker than the pressurization force exerted by the plunger moving in direction 1033. As a result, the level of fluid in accumulator chamber 1001 increases, as depicted by arrows 1010.

Upon the return stroke of the plunger 1030 as depicted in FIG. 12b, the decrease in capacity of pump chamber 1009 drives a flow of fluid into outlet conduit 1023 via delivery check valve 1013 as depicted by arrow 1056. Concurrently, the delivery check valve 1012 closes, due in part to the force of the suction effect created by the expansion of pump chamber 1008. Equally, plunger-driven fluid flow into outlet conduit 1022 also ceases at this stage. However, fluid continues to be propelled in direction 1007. This occurs due to the partial pressurization in accumulator chamber 1001 and also due to the momentum of the fluid in the outlet conduit 1022, which was imparted during the plunger stroke described in 12a. As a result, the fluid level in accumulator chamber 1001 falls once more. Once the plunger has ceased to move in this direction 1030, the process as depicted in FIG. 12a begins again.

In this way, the velocity of the body of fluid though the outlet conduits 1022, 1023 may be relatively constant, regardless of the direction of the plunger stroke. As a result, less energy may be spent accelerating the body of fluid at the beginning of each stroke. Furthermore, a more even flow velocity results in much smaller velocity peaks and therefore much lower frictional losses.

It will be appreciated that the accumulator chambers 1001, 1002 may utilize any type of hydraulic accumulator suitable for the deployment in the context of the present invention. This may include, but is not limited to, hydro-pneumatic accumulators or spring-type accumulators.

Use of a pump of this type in a Wave Energy Conversion system has a number of distinct advantages over alternative pump arrangements. Using raw seawater as the hydraulic fluid, obviates the environmental concerns surrounding the possible leakage of oil-based hydraulic pumps. However, use of raw seawater as hydraulic fluid presents its own problems, and the present arrangement is advantageous over alternative seawater pumps because of its low number of moving parts and wear resistant design. This means that it is robust and has low maintenance requirements, making it particularly suited to offshore deployment. Furthermore, while it is a single stage pump, it is nevertheless capable of delivering high pressures, and when implemented in conjunction with the WEC described herein, or other devices, is capable of operating at high levels of efficiency.

The Wave Energy Conversion system and associated PTO components discussed herein are suitable for generating energy in a number of ways. In one implementation of the present invention, the high-pressure seawater output by the pump described herein may be linked to a Pelton wheel turbine, in turn driving a dynamo in order to immediately generate electricity. Alternatively, the pump according to embodiments of the present invention may be used to pump fluid into a reservoir above sea level, thereby storing energy as gravitational potential energy. In addition, the Wave Energy Conversion system and associated PTO components may together be utilized in other contexts, such as provision of the requisite high pressure pumping action needed in a Reverse Osmosis desalination plant.

It will also be appreciated that while the pump as herein described is particularly suited for deployment as part of a Wave Energy Conversion system, it may also be of significant utility on its own in other applications. The pump—which may also be driven by systems other than the Wave Energy Conversion system described herein—may be employed for other applications, such as deep injection oil well drilling systems or Reverse Osmosis systems.

The phrase "incident wave" when used herein with reference to the present invention is used to indicate a wave that is in contact with the in question (in the present context, one of the pontoons of the device). In this context, "wave" will be taken to mean a full wave period, thereby including both a wave crest and a wave trough. Furthermore, the term "incident wave regime" will be taken to mean the characteristics of waves at a site at a given point in time, as opposed to the prevailing wave characteristics at that site.

The words "comprises/comprising" and the words "having/including" when used herein with reference to the present invention are used to specify the presence of stated features, integers, steps or components but does not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

We claim:

1. A wave energy conversion device for use in a body of water, comprising:
    a first pontoon configured to respond to an incident wave by operating in at least a first mode of motion;
    a second pontoon movably attached to the first pontoon by an attachment arrangement and configured to respond to an incident wave by operating in at least one second mode of motion different from the first mode of motion;
    wherein a relative motion of the first pontoon to the second pontoon in response to an incident wave is converted into a desired form of energy;
    wherein the first pontoon and the second pontoon each comprise an elongate body, wherein the second pontoon is attached to the first pontoon at a midpoint of an elongate axis of the first pontoon, and an elongate axis of the second pontoon is traverse to the elongate axis of the first pontoon; and
    wherein the second pontoon has a surface area greater than a surface area of the first pontoon, and a dimension of the second pontoon along its elongate axis which is located transverse to the elongate axis of the first pontoon is greater than a dimension of the first pontoon in a direction transverse to its elongate axis.

2. The device of claim 1, wherein the first pontoon and the second pontoon respond to the same incident wave.

3. The device of claim 1, wherein the mode of motion of the first pontoon is one or more of a heaving motion and a surging motion.

4. The device of claim 1, wherein the mode of motion of the second pontoon is one or more of a pitching motion, a surging motion, and a heaving motion.

5. The device of claim 1, wherein the device is orientated when in use such that the elongate axis of the first pontoon is parallel to the wave crests of incident waves and the elongate axis of the second pontoon is traverse to the wave crests of the incident waves.

6. The device of claim 1, wherein the dimension of the first pontoon along its elongate axis is determined by a prevailing wave crest length of the body of water where the device is to be located.

7. The device of claim 1, wherein a dimension of the device which is transverse to an axis of the wave crests of the body of water where the device is to be located is between 0.5 and 1 times, or between 0.6 and 1.1 times, a prevailing wavelength of the body of water where the device is to be located.

8. The device of claim 1, further comprising a tank for holding fluid, which is adapted to adjust the motion characteristics of the one or more modes of motion in which the pontoons are configured to operate.

9. The device of claim 1, wherein the attachment arrangement comprises a drive arm configured to have a single degree of freedom of movement.

10. The device of claim 1, wherein the first pontoon is configured to operate in a third mode of motion different from said first mode of motion and the second pontoon is configured to operate in the same third mode of motion in addition to said second mode of motion.

11. The device of claim 1, wherein the attachment arrangement is configured to have two different degrees of freedom of movement.

12. The device of claim 1, further comprising:
an energy output mechanism for converting the relative motion of the first pontoon to the second pontoon into a desired form of energy, wherein the energy output mechanism is linked to the attachment arrangement;
a sensor configured to detect an extent of motion of the first pontoon; and
an actuator configured to adjust a line of action between the energy output mechanism and the attachment arrangement in response to a signal generated by the sensor as a result of the detection, such that the line of action delivers a constant, uniform force to the energy output mechanism.

13. The device of claim 1, wherein said first mode of motion is a heaving motion and wherein said second mode of motion is a pitching motion.

14. The device of claim 8, wherein the tank comprises a fluid-tight cavity integrated into the second pontoon.

15. The device of claim 9, wherein the attachment arrangement comprises a drive linkage arranged to allow relative pivotal movement between the first and second pontoons.

16. The device of claim 11, wherein the arrangement comprises a drive linkage arranged to allow relative pivotal and horizontal movements between the first and second pontoons.

17. The device of claim 12, wherein the sensor comprises a shaft movably attached to the first pontoon such that when the device is located in a body of water, an elongate axis of the shaft is perpendicular to the surface of the water, and the sensor is free to move along its elongate axis relative to the first pontoon;
wherein a first end of the shaft is submerged and a second end of the shaft is located above the surface of the water, the first end being attached to a plate, the plate being configured to experience drag forces in the water such that movement of the first pontoon does not translate into commensurate movement of the sensor, thereby causing movement of the sensor relative to the first pontoon, and the second end being associated with a controller, the controller being configured to generate the signal for the actuator when the sensor moves relative to the first pontoon.

18. The device of claim 12, wherein the sensor is configured to detect the extent of motion of the first pontoon relative to the second pontoon, and comprises a rotary encoder located at the point of attachment between the attachment arrangement and the second pontoon, or a linear transducer located on or adjacent the energy output mechanism.

19. The device of claim 12, wherein the energy output mechanism comprises a pump, said pump comprising:
a first and a second fluid inlet for interacting with the body of water;
a pair of suction check valves, each suction check valve situated within one of the fluid inlets respectively, for permitting unidirectional fluid flow through each of said fluid inlets;
a first and a second fluid outlet in fluid communication with a single common fluid outlet manifold; a pair of pump chambers of equal volume situated adjacent to one another, each chamber in fluid communication with one of the fluid inlets and one of the fluid outlets, and each chamber further having an aperture arranged such that the two apertures are aligned;
a plunger block partially located in both pump chambers such that it protrudes through both apertures sufficiently to form a watertight seal with the apertures and which is moveable between both pump chambers;
wherein movement in a direction which increases a portion of the plunger block located in one pump chamber causes a commensurate decrease in a portion of the plunger block located in the other pump chamber;
and adapted such that, when in use, the pump delivers a single unidirectional fluid output flow at the fluid outlet manifold.

20. The device of claim 19, wherein the pump further comprises a pair of delivery check valves, each situated within one of the fluid outlets respectively, for permitting unidirectional fluid flow out of each of the pump chambers and through each of the fluid outlets into the fluid outlet manifold.

* * * * *